United States Patent [19]
Sample

[11] 3,981,198
[45] Sept. 21, 1976

[54] TRANSDUCING METHODS AND TRANSDUCERS

[75] Inventor: Winfield Sample, Sierra Madre, Calif.

[73] Assignee: Bell & Howell Company, Chicago, Ill.

[22] Filed: July 7, 1975

[21] Appl. No.: 593,395

[52] U.S. Cl. ............... 73/407 R; 73/398 AR; 73/41 D
[51] Int. Cl.² ............... G01L 7/08; G01L 9/04
[58] Field of Search ............ 73/407 R, 141 A, 410, 73/398 AR, 406; 338/4, 42, 41, 47, 36

[56] References Cited
UNITED STATES PATENTS

| | | | |
|---|---|---|---|
| 3,485,104 | 12/1969 | Sanford | 73/407 R |
| 3,695,096 | 10/1972 | Kutsay | 73/141 A |
| 3,857,452 | 12/1974 | Hartman | 73/141 A |

*Primary Examiner*—Donald O. Woodiel
*Attorney, Agent, or Firm*—Benoit Law Corporation

[57] ABSTRACT

An apparatus for providing a signal in response to a force producing physical condition comprises a laterally flexible tubular enclosure having two opposite ends, and a housing for that tubular enclosure. Bothe ends Both the tubular enclosure are maintained relatively stationary and the above-mentioned force is picked up outside the tubular enclosure. The picked-up force is applied to the tubular enclosure between the relatively stationary ends and the tubular enclosure is laterally flexed with that applied force between its relatively stationary ends. A device for generating the above mentioned signal is located inside the tubular enclosure for generating that signal during the flexing of the tubular enclosure.

30 Claims, 5 Drawing Figures

3,981,198

TRANSDUCING METHODS AND TRANSDUCERS

BACKGROUND OF THE INVENTION

1. Field of the Invention

The subject invention relates to liquid or fluid pressure transducers, including differential pressure transducers, and to other apparatus and devices, as well as to methods, for providing a signal in response to a force producing physical condition.

2. Description of the Prior Art

In the case of fluid pressure transducers there exists the problem that the transducing devices for generating an electric or other pressure signal, are often attacked or rendered useless by the fluid applied to the transducer. This tendency is particularly strong when the applied fluid is of a corrosive type. This problem is aggravated in the case of differential pressure transducers, where typically two fluids are applied to the transducer. Under those circumstances, and especially in the case of corrosive fluids, emersion of the transducing elements into either fluid will rapidly impair or destroy the transducing function. Some prior-art designs have attempted to solve this problem by providing a separate diaphragm for each fluid emitted to the transducer, and by arranging the transducing elements in the space between the two diaphragms. In those designs, the diaphragms were supposed to shield the transducing elements from the fluids applied to the transducer.

Proposals of the latter type are encumbered by several disadvantages, which includes the fact that an involvement of more than one diaphragm will not only cause significantly higher expenses and bulkier designs, but will also introduce different diaphragm characteristics and similiar mechanical and physical problems into the transducing function.

Against this background, two kinds of prior-art proposals for separating the transducing elements from the remainder of the transducer with the aid of bellows or similar flexible tubing can be discerned. In both kinds of proposals, a bellows structure is relatively stationarily mounted at one end and has a free opposite end.

In one kind of these proposals, the bellows structure is designed and arranged for depression of the free end toward the relatively stationary end in an axial or longitudinal direction through the bellows structure. This kind of design may, for instance, be seen from U.S. Pat. Nos. 2,867,115, 2,956,252, 3,020,405, 3,047,022, 3,559,488, 3,660,745, 3,756,085, 3,780,588, and 3,845,348. Application of this principle to a telephone transmitter may be seen from U.S. Pat. No. 2,191,992.

In the other kind of proposal, the free end of the bellows structure is moved laterally of the longitudinal bellows axis as may, for instance, be seen from U.S. Pat. Nos. 3,089,109 and 3,485,104.

In practice, both kinds of proposals are disadvantageous for several reasons, including the fact that the characteristics of the bellows structure with these designs will adversely enter into the transducing function, and the fact that the bellows structure in such designs will be exposed or subjected to axial compression, which will either falsify the transducer output or require special expensive and cumbersome measures for an avoidance or compensation of that deleterious effect.

Another proposal, mentioned here for the sake of completeness, is apparent from U.S. Pat. No. 3,127,571 and provides the transducing elements outside of a flexible tube into which the pressurized fluid is injected. That design is not practically suitable for differential pressure transducer designs and inherently lacks the advantages attainable with a well-defined diaphragm construction.

SUMMARY OF THE INVENTION

It is broadly an object of this invention to overcome the above mentioned disadvantages.

It is a related object of this invention to provide improved methods and apparatus for providing a signal in response to a force producing physical condition.

It is a further object of this invention to provide improved differential and other fluid pressure transducing methods and transducers.

It is a similar object of this invention to provide improved signal transducers wherein signal transducing elements are reliably protected against the effects of corrosive or otherwise harmful fluids.

It is a related object of this invention to provide improved signal transducing methods and apparatus in which the influence of an employed bellows structure on the transducer output is minimized.

Other objects will become apparent in the further course of this disclosure.

From the first aspect thereof, the invention resides in a method of providing a signal in response to a force producing physical condition with the aid of a signal transducing device comprising in combination the steps of providing a laterally flexible tubular enclosure having two opposite ends, locating said signal transducing device inside said tubular enclosure, maintaining both of said ends relatively stationary, picking up said force outside said tubular enclosure, applying said picked-up force to said tubular enclosure between said relatively stationary ends and laterally flexing said tubular enclosure with said applied force between said relatively stationary ends, maintaining said signal transducing device stationary relative to said flexing tubular enclosure, and transmitting said applied force to said relatively stationary signal transducing device to generate said signal inside and during the flexing of said tubular enclosure.

From another aspect thereof, the invention resides in a method of providing a signal in response to a force producing physical condition, with the aid of a signal transducing device comprising in combination the steps of providing a laterally flexible tubular enclosure having two opposite ends and having loci of symmetry extending along a straight line between said opposite ends in a relaxed condition of said tubular enclosure, locating said signal transducing device inside said tubular enclosure, maintaining both of said ends relatively stationary, picking up said force outside said tubular enclosure, applying said picked-up force to said tubular enclosure between said relatively stationary ends and laterally flexing said tubular enclosure with said applied force between said relatively stationary ends to cause arrangement of said loci of symmetry along a curved line intersecting said straight line at both of said ends, maintaining said signal transducing device stationary relative to said flexing tubular enclosure, and transmitting said applied force to said relatively stationary signal transducing device to generate said signal inside and during the flexing of said tubular enclosure.

From yet another aspect thereof, the invention resides in apparatus for providing a signal in response to a force producing physical condition, comprising in combination a a laterally flexible tubular enclosure having two opposite ends, means for housing said tubular enclosure, means in said housing means for maintaining both of said ends relatively stationary, means for picking up said force outside said tubular enclosure, means inside said housing means for applying said picked-up force to said tubular enclosure between said relatively stationary ends and laterally flexing said tubular enclosure with said applied force between said relatively stationary ends, means located inside of and coupled to said tubular enclosure for generating said signal during the flexing of said tubular enclosure and means located inside of said tubular enclosure for mounting said signal generating means in a stationary condition relative to said flexing tubular enclosure.

From another aspect thereof, the invention resides in an apparatus for providing a signal in response to a force producing physical condition, comprising in combination a laterally flexible tubular enclosure having two opposite ends and having loci of symmetry extending along a straight line between said opppsite ends in a relaxed condition of said tubular enclosure, means for housing said tubular enclosure, means in said housing means for maintaining both of said ends relatively stationary, means for picking up said force outside said tubular enclosure, means for arranging said loci of symmetry along a curved line intersecting said straight line at both of said ends, said arranging means including means inside said housing means for applying said picked-up force to said tubular enclosure between said relatively stationary ends and laterally flexing said tubular enclosure with said applied force between said relatively stationary ends, means located inside of and coupled to said tubular enclosure for generating said signal during the flexing of said tubular enclosure and means located inside of said tubular enclosure for mounting said signal generating means in a stationary condition relative to said flexing tubular enclosure.

From still another aspect thereof, the invention resides in a fluid pressure transducer, comprising in combination a housing, a tubular bellows structure in said housing having opposite first and second ends, a mounting post extending in said housing through said bellows structure, means for sealing the inside of said bellows structure against its environment in said housing, including means for attaching said first and second tubular bellows structure ends to spaced portions of said mounting post whereby to maintain said ends relatively stationary, first transducing means mounted on said mounting post inside said bellows structure between said spaced portions for transducing a variable force into a corresponding signal, means for admitting a fluid the pressure of which is to be transduced to the inside of said housing whereby to immerse said bellows structure in said fluid, second transducing means for transducing the pressure of said admitted fluid into a variable force, and means inside said housing for laterally flexing said bellows structure with said transduced variable force between said relatively stationary ends and for transmitting said transduced variable force to said first transducing means inside said bellows structure.

BRIEF DESCRIPTION OF THE DRAWINGS

The subject invention and its various aspects and objects will become more readily apparent from the following detailed description of preferred embodiments thereof, illustrated by way of example in the following drawings, in which like reference numerals designate like or functionally equivalent parts, and in which.

DESCRIPTION OF PREFERRED EMBODIMENTS

Figure 1:
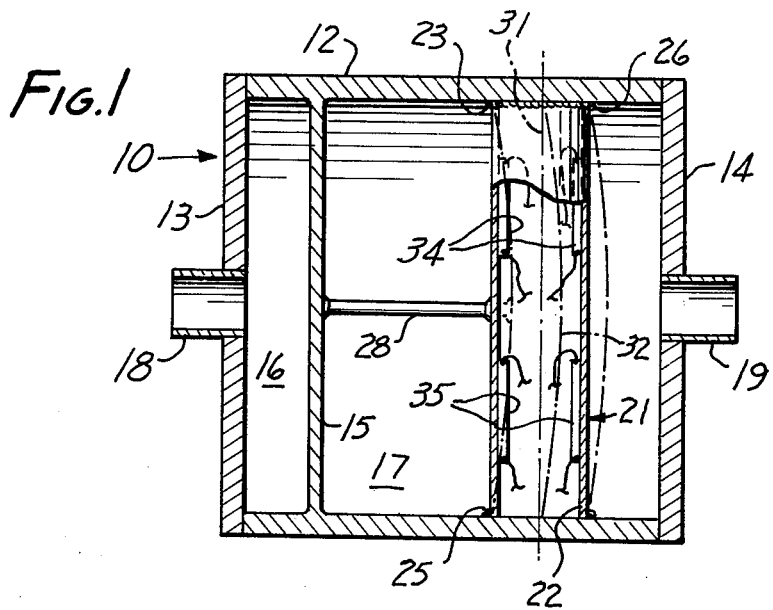
FIG. 1 is a section through a differential pressure transducer in accordance with a first preferred embodiment of the subject invention.

The differential pressure transducer 10 of the preferred embodiment of the subject invention shown in FIG. 1 has an essentially circular housing equipped with end plates 13 and 14 fastened thereto by conventional screws or other fastening means (not shown) and sealed thereto in a manner conventional with pressure transducers.

The differential pressure transducers herein illustrated includes a single diaphragm 15 dividing the housing 12 into two fluid chambers 16 and 17. This, indeed, presents the presently most preferred embodiment, as a single diaphragm in a differential pressure transducer avoids the many problems incurred in prior-art equipment employing two diaphragms within which the transducing elements are disposed and protected from the fluid environment. It should, however, be understood that the subject invention, in its broad utility, is not restricted to differential pressure transducers.

The end plate 13 carries a first inlet 18 for admitting a first fluid or liquid to the transducer chamber 16 to one side of the diaphragm 15. Similarly, the end plate 14 carries an inlet 19 for admitting a second fluid to the transducer chamber 17 at the other side of the diaphragm 15. In this manner, the single diaphragm 15 is exposed to a differential in pressure between the first and second fluids.

The pressure transducer 10 shown in FIG. 1, as well as the pressure transducers shown in the other drawings, has a laterally flexible tubular enclosure 21 having two opposite ends 22 and 23 and being housed in the enclosure or housing 12 with end plates 13 and 14.

The tubular enclosure 21 is made of a material, is of a design and has a wall thickness so as to be laterally flexible. By way of example, the tubular enclosure 21 may comprise a thin-walled tube of a copper and nickel alloy, such as Monel metal, copper, such as beryllium copper, bronze, such as phosphor bronze, nickel, stainless steel or another flexible material.

Pursuant to the subject invention, both ends 22 and 23 of the tubular enclosure 21 are maintained relatively stationary. In the preferred embodiment shown in FIG. 1, this is accomplished by fastening or attaching the tubular end portions 22 and 23 to the housing 12, such as by means of circular welds 25 and 26. This restrains the tubular enclosure 21 against axial motion or compression in response to fluid pressure or other influences which could falsify the transducer output signal.

A rod 28 extends between and is connected to the diaphragm 15 and a portion of the tubular enclosure 21 between the ends 22 and 23 for transmitting for force picked-up by the diaphragm 15 in response to the net fluid pressure to the tubular enclosure 21.

In particular, the rod 28 applies the pressure responsive picked-up force to the tubular enclosure 21 between the relatively stationary ends 22 and 23 and laterally flexes the tubular enclosure 21 with that applied force between the relatively stationary ends 22 and 23.

As shown in FIG. 1, the axis of symmetry, or the loci of symmetry along that axis, of the tubular enclosure 21 extend along a straight line 31 between the opposite ends 22 and 23 in a relaxed condition of the tubular enclosure 21. Lateral flexure of the tubular enclosure 21 by the above mentioned picked-up force via the rod 28 causes an arrangement of the loci of symmetry along a curved line 32 intersecting the straight line 31 at both of the ends 22 and 23.

Loosely speaking, one could rephrase the latter statement by saying that the applied picked-up force flexes the tubular enclosure 21 so as to bend its normally straight axis of symmetry 31 in the manner shown at 32.

This is expressed herein by referring to the loci of of symmetry, since the geometric concept of "axis of symmetry" is not believed applicable to curved lines.

The force applied to the tubular enclosure 21 is employed to generate inside and during the flexing of the tubular enclosure a signal indicative of the net pressure picked up by the diaphragm 15. Various methods and means for generating this transducer signal are within the broad contemplation of the subject invention.

For example, the transducer output signal may be generated by measuring the flexure of the tubular enclosure 21 and providing a signal corresponding to that measure of flexure or by measuring the strain of a wall portion of the tubular enclosure 21 inside and during the flexure of the tubular enclosure and providing a signal corresponding to that measured strain.

The latter technique is employed in the apparatus shown in FIG. 1. In particular, two pairs of strain gages 34 and 35 are bonded to the inner wall surface of the tubular enclosure 21 between the end portion 22 and the force transmitting rod 28, and between the end portion 23 and that force transmitting rod, respectively. The strain gages 34 and 35 are part of a strain gage measuring system which typically includes a Wheatstone bridge or equivalent equipment (not shown) for generating an electrical signal corresponding to the measured strain.

In this manner, the desired electric signal in response to the force producing physical condition, to which the diaphragm 15 is being exposed, is generated.

In accordance with the principles of the subject invention, the transducer signal generating devices 34 and 35 are well protected by the flexible tubular enclosure from the effects of the fluid environment existing in the transducer chamber 17.

In the preferred embodiments of the subject invention shown in FIGS. 2 to 5, the picked-up force is simultaneously transmitted to a location inside the tubular enclosure 21 while being applied for the above mentioned lateral flexing of that tubular enclosure. The tranducer signal is then generated inside the tubular enclosure in response to that transmitted force.

Figure 2:
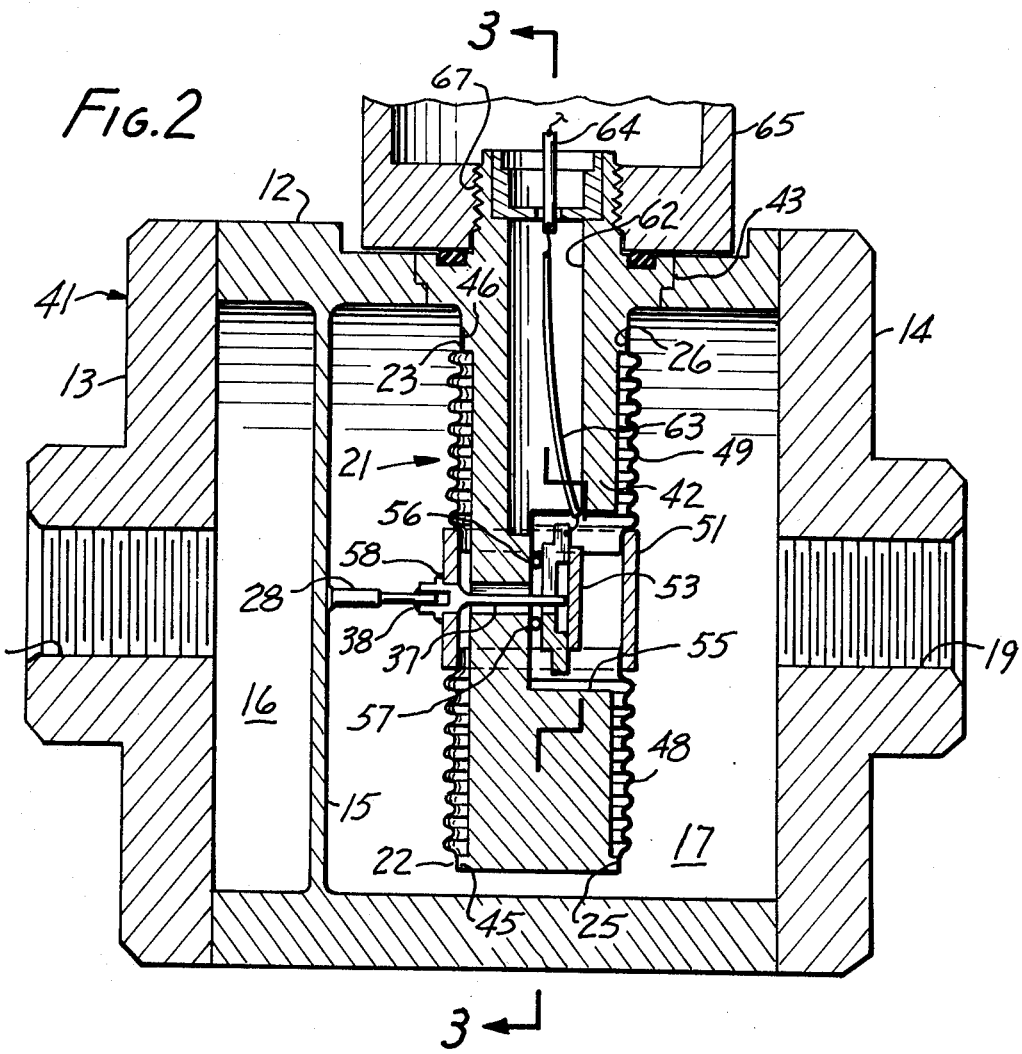
FIG. 2 is a section through a differential pressure transducer in accordance with a second preferred embodiment of the subject invention.
Figure 4:
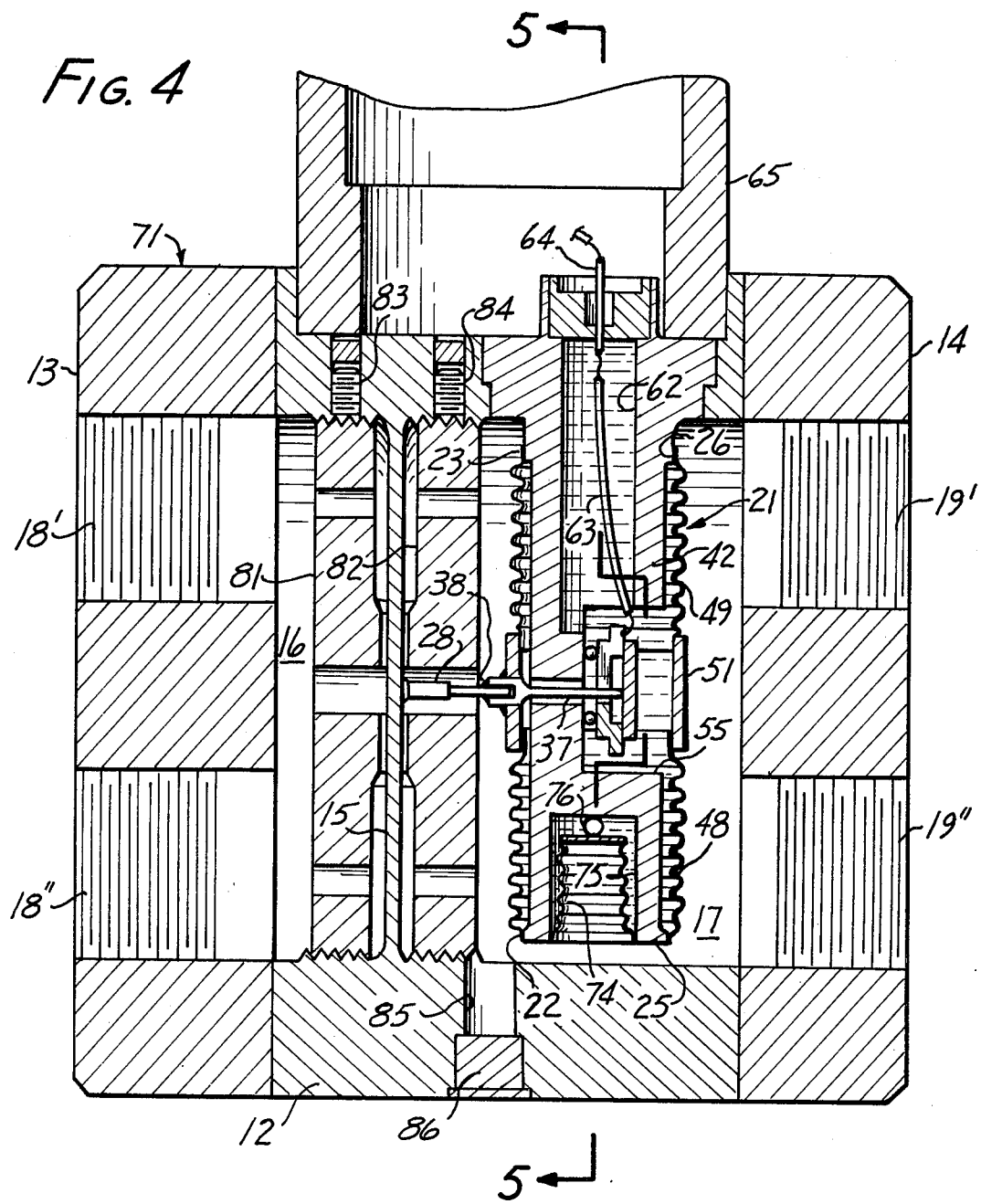
FIG. 4 is a section through a differential pressure transducer in accordance with a third preferred embodiment of the subject invention.

In particular, FIGS. 2 and 4 show the force transmitting rod 28 effectively extended into the tubular enclosure 21 by an extension rod 37 welded or otherwise connected to the rod 28 at 38. In this manner, the picked-up force is simultaneously transmitted to a location inside the tubular enclosure 21 while being applied to, and for the above mentioned lateral flexing of, the tubular enclosure 21.

In the preferred embodiments shown in FIGS. 2 to 5 the tubular enclosure 21 has the form of a bellows structure. This conforms to the best mode presently contemplated, and it should be understood that the flexible tubular structure 21 of the embodiment shown in FIG. 1 may also have the form of a bellows structure.

In particular, a bellows structure has the advantage of influencing the transducing process in a very minor and in most cases practically negligible manner. The above mentioned adverse influence of the prior-art dual diaphragm differential transducer system is thus practically eliminated without any sacrifice of the transducing element protective function obtained by a disposition of the transducing elements inside a space that is guarded from corrosive fluids and other deleterious influences.

The preferred embodiments shown in FIGS. 2 to 5 include a mounting post 42 which extends in the transducer housing 12 through the bellows structure and which is pressfit or otherwise connected to a wall portion of the housing 12 at 43.

The means in FIGS. 2 to 5 for sealing the inside of the bellows structure against its environment in the housing 12, such as against the fluid in which it is immersed in the transducer chamber 17, include welds 25 and 26 or equivalent fastening means for attaching the first and second ends 22 and 23 to spaced portions 45 and 46, respectively of of the mounting post 42, whereby to maintain the ends 22 and 23 relatively stationary in accordance with the principles of the subject invention.

In the preferred embodiments shown in FIGS. 2 to 5, the bellows structure includes a first tubular bellows 48 extending from the spaced post portion 45 to a midportion of the mounting post and a second tubular bellows 49 extending from the other spaced portion 46 to a midportion of the mounting post. The bellows structure further includes a rigid tubular member 51 which extends between the first and second tubular bellows 48 and 49. These tubular bellows are welded or otherwise sealably connected to the tubular member 51 to preserve the sealed integrity of the tubular enclosure 21.

The tubular member 51 may be of the same material as the bellows 48 and 49, or may be of a different material. The rigidity of the tubular member 51 is typically realized by providing it with a substantially thicker wall than the tubular bellows 48 and 49.

A transducing or sensing element 53 is attached to or mounted on the mounting post 42 and is located in a cavity 45 cut into a midportion of the mounting post. By way of example, the sensing element 53 may be a diffused silicon beam sensor or other transducing device which, if desired, may be welded to the mounting post via three circularly arranged spheres, two of which are visible at 56 and 57.

The force transmitting rod extension 37 is welded or otherwise connected to the rigid tubular member 51 at 58 and extends through that tubular member and also through a bore in the mounting post 42 into force-transmitting engagement with the sensing element 53. Provision of the tubular member 51 in a rigid form between the flexible bellows 48 and 49 is an important feature of the preferred embodiments illustrated in FIGS. 2 to 5, as the rigid form of that tubular member 51 resists compression by the applied fluids and thus eliminates a disturbance factor that could otherwise affect the transducing signal.

It will thus be noted that the rod 28, connected to the diaphragm 15, and part of its extension 37 constitute a flexing and transmitting means connected to the rigid tubular member 51 at 58 for laterally displacing that rigid tubular member with a transduced variable force picked up by the diaphragm 15. This variable displacement of the rigid tubular member 51 effects a variable flexure of the part of the tubular enclosure comprised of the tubular bellows 48 and 49. Since the rod extension 37 effectively connects the tubular member 51 and thus the tubular enclosure to the sensing device 53, it may be said that the flexure of the tubular enclosure 21 is being measured for providing a signal corresponding to that measured flexure or, in other words, to the force picked up by the diaphragm 15 and rod 28.

The mounting post 42 in the preferred embodiments of FIGS. 1 to 5 maintains the sensing or signal transducing device 53 stationary relative to the flexing tubular enclosure 21, and has a longitudinal bore 62 for accommodating leads 63 which connect the sensing or transducing device 53 to terminals 64 in a junction box or electric component housing 65 which is threaded onto the mounting post 42 at 67. As before, the sensing device 53 may be part of a Wheatstone bridge or other electric measuring or indicating circuit (not shown).

Figure 5:
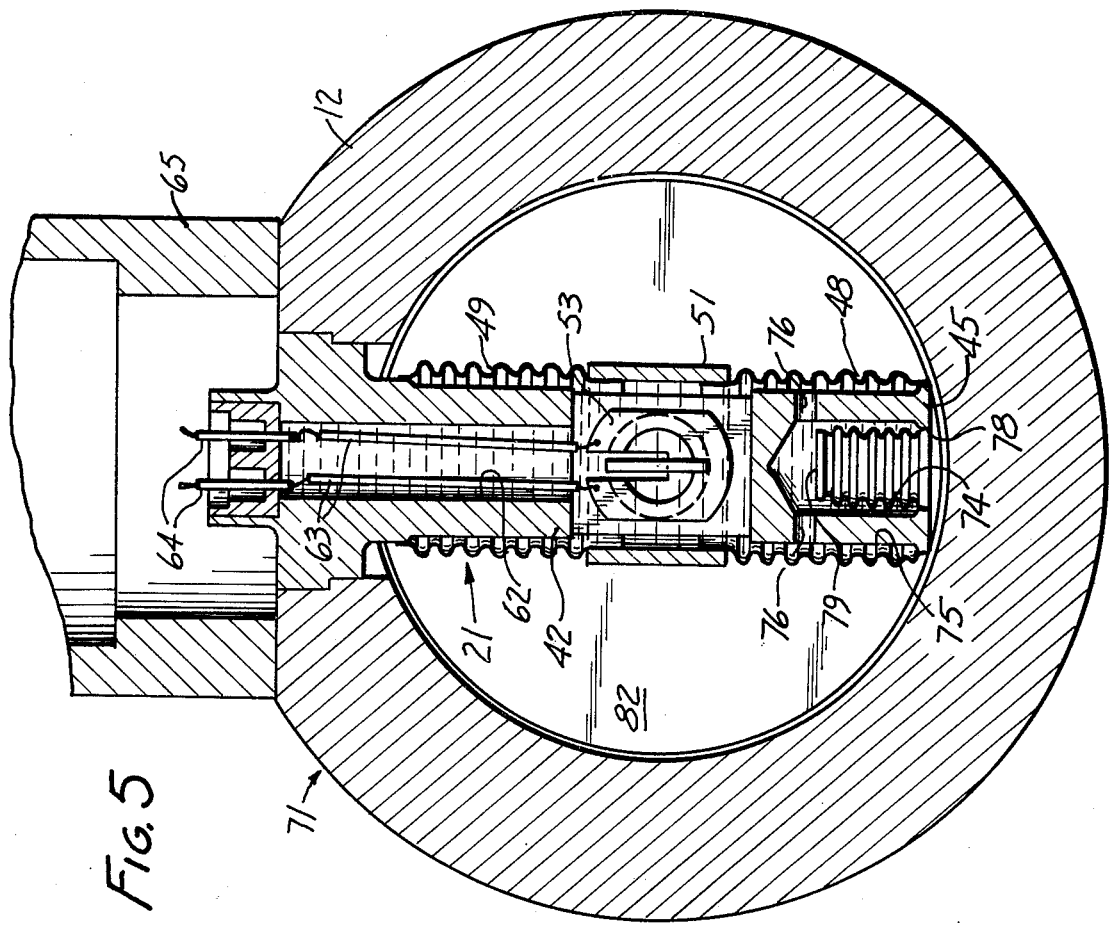
FIG. 5 is a cross section taken along the line 5—5 in FIG. 4.
Figure 3:
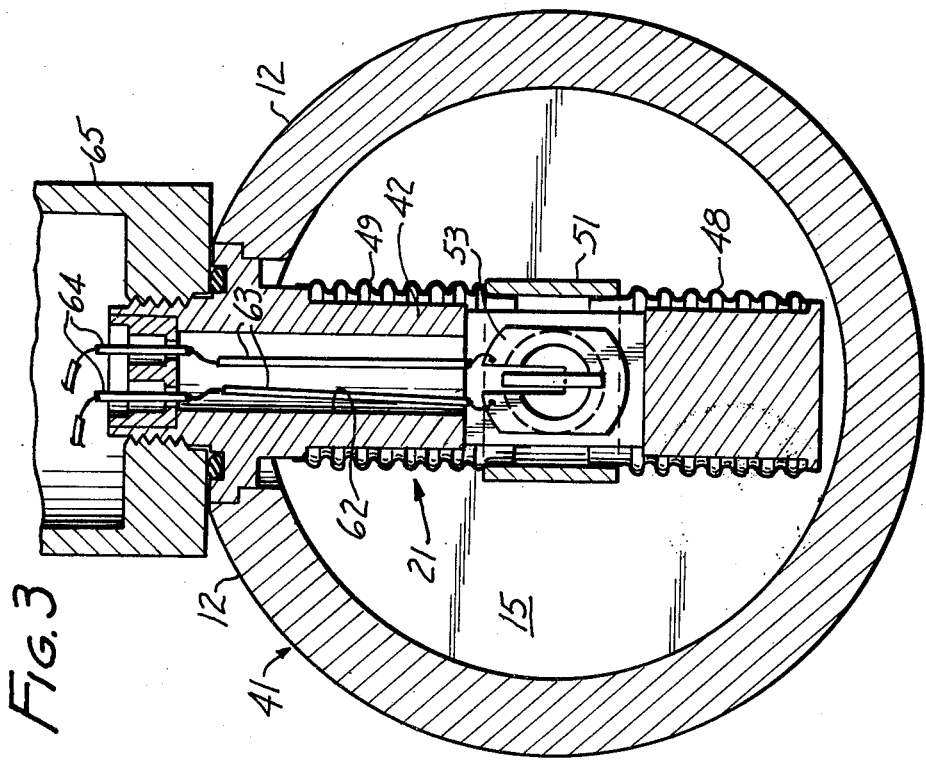
FIG. 3 is a cross section taken along the line 3—3 in FIG. 2.

The differential pressure transducer 71 according to the preferred embodiment of the subject invention shown in FIGS. 4 and 5 is similar in operation and structure to the the pressure transducer 41 shown in FIGS. 2 and 3, except for the differences presently to be pointed out.

The transducer 71 of FIGS. 4 and 5 is designed for a fluid filled tubular enclosure 21. In particular, the tubular enclosure 21, including the bellows 48 and 49 and rigid tubular member of annulus 51, and the cavity 55 and bore 62 of the mounting post 42 may be filled with oil or another liquid which, through its practical incompressability, will withstand any compression of the tubular enclosure including bellows 48 and 49 by the pressurized fluid admitted to the transducer chamber 17 in which the mounting post 42 extends with its surrounding bellows structure.

In accordance with the illustrated preferred embodiment of FIGS. 4 and 5, the transducer 71 includes an equalization of the pressure outside and inside of the tubular enclosure 21, in the form of a pressure equalizing bellows 74 on the mounting post 42. In particular, the auxiliary bellows 74 is preferably disposed in a bore 75 which extends in the mounting post 42 and which communicates with the inside of the tubular enclosure or bellows structure 21 through apertures 76.

One end 78 is welded or otherwise sealed and attached to the lower end portion 45 of the mounting post 42. The other end of the equalization bellows 42 is closed by a plate 79 attached thereto. In this manner, the equalizing bellows 34 has a first side including the lower surface of the plate 79 exposed to the admitted pressurized fluid inside the transducer chamber 17 in the housing 12, and a second side including the upper surface of the plate 79 exposed to the inside of the tubular enclosure or bellows structure 21. This provides for a pressure equalization between the admitted fluid and the fluid or liquid filling inside the tubular enclosure 12.

The pressure transducer 71 of FIGS. 4 and 5 has been provided, by way of example, with a pair of fluid inlets 18' and 18'' for the fluid chamber 16 and with a pair of inlets 19' and 19'' for the chamber 17, to increase the versatility of the differential pressure transducer.

In addition, the maximum amplitude of the diaphragm 15 and equipment connected thereto via the rod 28 is limited by a pair of stopping structures or stops 81 and 82 which are threaded into the housing 12 and which are arrestable at any adjusted position by set screws 83 and 84, respectively.

The subject extensive disclosure will suggest or render apparent various modifications and variations within the spirit and scope of the invention to those skilled in the art.

I claim:

1. A method of providing a signal in response to a force producing physical condition with the aid of a signal transducing device comprising in combination the steps of:

providing a laterally flexible tubular enclosure having two opposite ends;

locating said signal transducing device inside said tubular enclosure;

maintaining both of said ends relatively stationary;

picking up said force outside said tubular enclosure;

applying said picked-up force to said tubular enclosure between said relatively stationary ends and laterally flexing said tubular enclosure with said applied force between said relatively stationary ends;

maintaining said signal transducing device stationary relative to said flexing tubular enclosure; and transmitting said applied force to said relatively stationary signal transducing device to generate said signal inside and during the flexing of said tubular enclosure.

2. A method as claimed in claim 1, wherein:

said signal is generated by measuring the flexure of said tubular enclosure and providing a signal corresponding to said measured flexure.

3. A method as claimed in claim 1, wherein:

said picked-up force is simultaneously transmitted to said relatively stationary signal transducing device inside said tubular enclosure while being applied for said lateral flexing of said tubular enclosure; and said signal is generated inside said tubular enclosure by said relatively stationary transducing device in response to said simultaneously transmitted force.

4. A method as claimed in claim 1, including the step of:

equalizing the pressures outside and inside of said tubular enclosure.

5. A method as claimed in claim 1, including the step of:

equalizing the pressures outside and inside of said tubular enclosure.

6. A method of providing a signal in response to a force producing physical condition with the aid of a signal transducing device comprising in combination the steps of:

providing a laterally flexible tubular enclosure having two opposite ends and having loci of symmetry extending along a straight line between said opposite ends in a relaxed condition of said tubular enclosure;

locating said signal transducing device inside said tubular enclosure;

maintaining both of said ends relatively stationary;

picking up said force outside said tubular enclosure;

applying said picked-up force to said tubular enclosure between said relatively stationary ends and laterally flexing said tubular enclosure with said applied force between said relatively stationary ends to cause arrangement of said loci of symmetry along a curved line intersecting said straight line at both of said ends;

maintaining said signal transducing device stationary relative to said flexing tubular enclosure; and transmitting said applied force to said relatively stationary signal transducing device to generate said signal inside and during the flexing of said tubular enclosure.

7. A method as claimed in claim 6, wherein:
said signal is generated by measuring the flexure of said tubular enclosure and providing a signal corresponding to said measured flexure.

8. A method as claimed in claim 6, wherein:
said picked-up force is simultaneously transmitted to said relatively stationary signal transducing device inside said tubular enclosure while being applied for said lateral flexing of said tubular enclosure; and said signal is generated inside said tubular enclosure by said relatively stationary transducing device in response to said simultaneously transmitted force.

9. An apparatus for providing a signal in response to force producing physical condition, comprising in combination;

a laterally flexible tubular enclosure having two opposite ends;

means for housing said tubular enclosure;

means in said housing means for maintaining both of said ends relatively stationary;

means for picking up said force outside said tubular enclosure;

means inside said housing means for applying said picked-up force to said tubular enclosure between said relatively stationary ends and laterally flexing said tubular enclosure with said applied force between said relatively stationary ends;

means located inside of and coupled to said tubular enclosure for generating said signal during the flexing of said tubular enclosure; and means located inside of said tubular enclosure for mounting said signal generating means in a stationary condition relative to said flexing tubular enclosure.

10. An apparatus as claimed in claim 9, wherein:
said signal generating means include means located inside of and coupled to said tubular enclosure for measuring the flexure of said tubular enclosure and for providing a signal corresponding to said measured flexure.

11. An apparatus as claimed in claim 9, including:
means located inside of and connected to said tubular enclosure for transmitting said applied force to said signal generating means inside said tubular enclosure.

12. An apparatus as claimed in claim 9, wherein:
said force pick-up means include a diaphragm in said housing means for receiving said force.

13. An apparatus as claimed in claim 9, including:
means coupled to said tubular enclosure for equalizing the pressures outside and inside said tubular enclosures.

14. An apparatus as claimed in claim 9, wherein:
said means for maintaining both of said ends relatively stationary and said means for mounting said signal generating means are integral.

15. An apparatus as claimed in claim 9, wherein:
said means for maintaining both of said ends relatively stationary and said means for mounting said signal generating means jointly include a mounting post.

16. An apparatus for providing a signal in response to a force producing physical condition, comprising in combination:

a laterally flexible tubular enclosure having two opposite ends and having loci of symmetry extending along a straight line between said opposite ends in a relaxed condition of said tubular enclosure;

means for housing said tubular enclosure;

means in said housing means for maintaining both of said ends relatively stationary;

means for picking up said force outside said tubular enclosure;

means for arranging said loci of symmetry along a curved line intersecting said straight line at both of said ends, said arranging means including means inside said housing means for applying said picked-up force to said tubular enclosure between said relatively stationary ends and laterally flexing said tubular enclosure with said applied force between said relatively stationary ends;

means located inside of and coupled to said tubular enclosure for generating said signal during the flexing of said tubular enclousre; and means located inside of said tubular enclosure for mounting said signal generating means in a stationary condition relative to said flexing tubular enclosure.

17. An apparatus as claimed in claim 16, wherein:
said signal generating means include means located inside of and coupled to said tubular enclosure for measuring the flexure of said tubular enclosure and for providing a signal corresponding to said measured flexure.

18. An apparatus as claimed in claim 16, including:
means located inside of and connected to said tubular enclosure for transmitting said applied force to said signal generating means inside said tubular enclosure.

19. An apparatus as claimed in claim 16, wherein:
said force pick-up means include a diaphragm in said housing means for receiving said force.

20. An apparatus as claimed in claim 16, including:
means coupled to said tubular enclosure for equalizing the pressures outside and inside said tubular enclosures.

21. An apparatus as claimed in claim 16, wherein:
said means for maintaining both of said ends relatively stationary and said means for mounting said signal generating means are integral.

22. An apparatus as claimed in claim 16, wherein:
said means for maintaining both of said ends relatively stationary and said means for mounting said signal generating means jointly include a mounting post.

23. A fluid pressure transducer, comprising in combination:

a housing;

a tubular bellows structure in said housing having opposite first and second ends;

a mounting post extending in said housing through said bellows structure;

means for sealing the inside of said bellows structure against its environment in said housing, including means for attaching said first and second tubular bellows structure ends to spaced portions of said mounting post whereby to maintain said ends relatively stationary;

first transducing means mounted on said mounting post inside said bellows structure between said spaced portions for transducing a variable force into a corresponding signal;

means for admitting a fluid the pressure of which is to be transduced to the inside of said housing whereby to immerse said bellows structure in said fluid;

second transducing means for transducing the pressure of said admitted fluid into a variable force; and means inside said housing for laterally flexing said bellows structure with said transduced variable force between said relatively stationary ends and for transmitting said transduced variable force to said first transducing means inside said bellows structure.

24. A fluid pressure transducer as claimed in claim 23, wherein:

said second transducing means include a diaphragm exposed to said admitted fluid and coupled to said flexing and transmitting means.

25. A fluid pressure transducer as claimed in claim 23, wherein:

said fluid pressure transducer includes a single diaphragm dividing said housing into two fluid chambers and coupled to said flexing and transmitting means;

said fluid admitting means include first means for admitting a first fluid to one of said chambers, and second means for admitting a second fluid to the other of said chambers whereby to expose said single diaphragm to a differential in pressure between said first and second fluids; and said mounting post and tubular bellows structure are located in said first chamber whereby said tubular bellows structure is immersed in said first fluid.

26. A fluid pressure tranducer as claimed in claim 23, wherein:

said bellows structure includes a first tubular bellows extending from one of said spaced portions to a midportion of said mounting post, a second tubular bellows extending from the other said spaced portions to said midportion, and means at said midportion for sealing said bellows structure and uniting said first and second bellows.

27. A fluid pressure transducer as claimed in claim 26, wherein:

said bellows uniting means include a rigid tubular member extending between said first and second bellows.

28. A fluid pressure transducer as claimed in claim 27, wherein:

said flexing and transmitting means are connected to said rigid tubular member and include means for laterally displacing said rigid tubular member with said tranduced variable force.

29. A fluid pressure transducer as claimed in claim 23, including:

means for equalizing the pressure inside and outside of said bellows structure.

30. A fluid pressure transducer as claimed in claim 23, including;

a pressure equalizing bellows on said mounting post having a first side exposed to said admitted fluid inside said housing, and a second side exposed to the inside of said bellows structure.

* * * * *